(12) United States Patent
Cummings

(10) Patent No.: US 8,230,030 B2
(45) Date of Patent: Jul. 24, 2012

(54) ELECTRONIC DEVICE AND METHOD OF CONTROLLING OUT-OF-OFFICE NOTIFICATIONS

(75) Inventor: Joel George Cummings, Waterloo (CA)

(73) Assignee: Research In Motion Limited, Waterloo (CA)

(*) Notice: Subject to any disclaimer, the term of this patent is extended or adjusted under 35 U.S.C. 154(b) by 176 days.

(21) Appl. No.: 12/697,038

(22) Filed: Jan. 29, 2010

(65) Prior Publication Data

US 2011/0191424 A1 Aug. 4, 2011

(51) Int. Cl.
G06F 15/16 (2006.01)

(52) U.S. Cl. ........................ 709/206; 709/204

(58) Field of Classification Search .......... 709/204–207, 709/223–224
See application file for complete search history.

(56) References Cited

U.S. PATENT DOCUMENTS

| | | | |
|---|---|---|---|
| 7,403,599 B2 * | 7/2008 | Amin | 379/88.14 |
| 2006/0083358 A1 * | 4/2006 | Fong et al. | 379/88.13 |
| 2008/0040177 A1 * | 2/2008 | Vuong et al. | 705/8 |
| 2010/0174787 A1 * | 7/2010 | Gupta | 709/206 |
| 2010/0174896 A1 * | 7/2010 | Gupta | 713/100 |
| 2011/0010218 A1 * | 1/2011 | Gupta | 705/9 |
| 2011/0208813 A1 * | 8/2011 | Storrie et al. | 709/204 |

OTHER PUBLICATIONS

Statement in accordance with the Notice from the European Patent Office dated Oct. 1, 2007 concerning business methods (OJ EPO Nov. 2007, 592-593), Nov. 1, 2007, pp. 592-593, XP002456252 ISSN: 0170-9291.
European Search Report issued Mar. 22, 2010, in respect of corresponding European Patent Application No. 10152111.0.
Website: http://www.sherpasoftware.com/lotus-notes-products/mail-attender.shtml published at least as early as Jan. 29, 2010.
Website: http://www.microsoft.com/exchange/2007/evaluation/outlooktogether.mspx published at least as early as Jan. 29, 2010.
Website: http://office.microsoft.com/en-us/outlook/HA102098191033.aspx#4A published at least as early as Jan. 29, 2010.
Website: http://www-10.lotus.com/ldd/nd8forum.nsf/4b9931b774db788c85256bf0006b5e6d/06e3ed4f1abd3b64852573e9004f802d?OpenDocument published Feb. 8, 2008.
Website: http://www2.slac.stanford.edu/comp/messaging/Using/custom-out-of-office.htm published Jul. 22, 2010.

* cited by examiner

*Primary Examiner* — Joshua Joo
(74) *Attorney, Agent, or Firm* — Geoffrey deKleine; Borden Ladner Gervias LLP

(57) ABSTRACT

A method of controlling an electronic device, the method comprising detecting, at the electronic device, occurrence of an event for turning on an out-of-office assistant, for each account, associated with a respective PIM service, that is operational on the electronic device, determining if the PIM service is operable to receive updates, when the PIM service is operable to receive an update from the electronic device to turn on an out-of-office notification, sending the update from the electronic device to the PIM service, otherwise, sending an out-of-office notification, from the electronic device, in response to receipt of an email message at the electronic device, via the PIM service.

17 Claims, 12 Drawing Sheets

ELECTRONIC DEVICE AND METHOD OF CONTROLLING OUT-OF-OFFICE NOTIFICATIONS

TECHNICAL FIELD

The present application relates generally to managing multiple PIM service accounts utilizing a portable electronic device and to out-of-office notifications.

BACKGROUND

Portable electronic devices including, for example, smart telephone and wireless PDAs are becoming increasingly common and typically integrate functions of personal information management (PIM) such as address book applications and calendar applications, and data communications such as email, World Wide Web browsing and telecommunications in a single device. Such devices run on a wide variety of networks from data-only networks such as Mobitex and DataTAC to complex voice and data networks such as GMSIGPRS, CDMA, EDGE, UMTS and W-CDMA networks.

In many cases, users keep different PIM data records in different PIM service accounts depending on the nature of the data record. For example a user may store all business-related address book data records using a calendar application at an enterprise computer while all personal-related time-dependent events are stored in an alternate address book application, for example using an online PIM service account such as those offered by Google™ or Yahoo!™. Some of these online PIM service accounts permit the user to transfer PIM data records from the online PIM service account to the portable electronic device and vice versa.

Improvements in the managing multiple PIM service accounts utilizing a portable electronic device is desirable.

BRIEF DESCRIPTION OF THE DRAWINGS

Embodiments of the present invention will now be described, by way of example only, with reference to the attached Figures, wherein.

DETAILED DESCRIPTION

Figure 1:
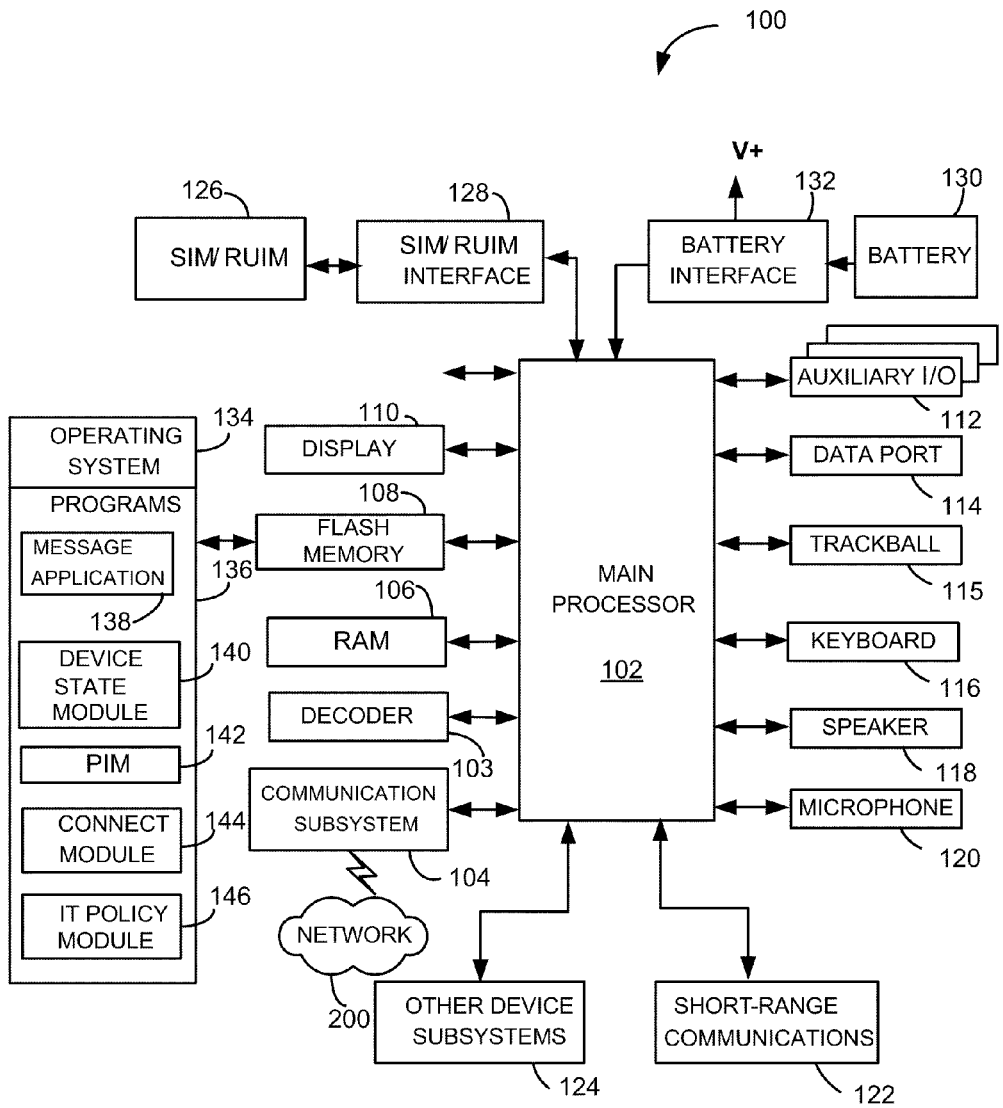
FIG. 1 is an example of a block diagram of an embodiment of a portable electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered to be limited to the scope of the embodiments described herein.

The embodiments described herein generally relate to portable electronic devices. Examples of portable electronic devices include mobile or handheld wireless communication devices such as pagers, cellular phones, cellular smartphones, wireless organizers, personal digital assistants, computers, laptops, handheld wireless communication devices, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). To aid the reader in understanding the structure of the portable electronic device and how it communicates with other devices and host systems, reference will now be made to FIG. 1 through FIG. 4.

Referring first to FIG. 1, shown therein is an example of a block diagram of an embodiment of a portable electronic device 100. The portable electronic device 100 includes a number of components such as a main processor 102 that controls the overall operation of the portable electronic device 100. Communication functions, including data and voice communications, are performed through a communication subsystem 104. Data received by the portable electronic device 100 can be decompressed and decrypted by a decoder 103, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 104 receives messages from and sends messages to a wireless network 200. In this example embodiment of the portable electronic device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with portable electronic device 100 is a GSM/GPRS wireless network in one implementation, other wireless networks may also be associated with the portable electronic device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks such as EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a memory 108, a display 110, an auxiliary input/output (I/O) subsystem 112, a data port 114, a trackball 115, a keyboard 116, a speaker 118, a microphone 120, short-range communications 122 and other device subsystems 124.

Some of the subsystems of the portable electronic device 100 perform communication-related functions, whereas other subsystems may provide "resident" or on-device functions. By way of example, the display 110, the trackball 115 and the keyboard 116 may be used for both communication-related functions, such as entering a text message for transmission over the network 200, and device-resident functions such as a calculator or task list.

The portable electronic device 100 can send and receive communication signals over the wireless network 200 after network registration or activation procedures have been completed. Network access is associated with a subscriber or user of the portable electronic device 100. To identify a subscriber, a SIM/RUIM card 126 (i.e. Subscriber Identity Module or a Removable User Identity Module) is inserted into a SIM/RUIM interface 128 in order to communicate with a network. The SIM/RUIM card 126 is a type of a conventional "smart card" that can be used to identify a subscriber of the portable electronic device 100 and to personalize the portable electronic device 100, among other things. In the present embodiment, the portable electronic device 100 is not fully operational for communication with the wireless network 200 without the SIM/RUIM card 126. By inserting the SIM/RUIM card 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical portable electronic device. The SIM/RUIM card 126 may store additional subscriber information for a portable electronic device as well, including datebook (or calendar) information and recent call information. Alternatively, user identification information can also be programmed into the memory 108.

The portable electronic device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the portable electronic device 100. Although current technology makes use of a battery, future technologies such as micro fuel cells may provide the power to the portable electronic device 100.

The portable electronic device 100 also includes an operating system 134 and software components 136 to 146 which are described in more detail below. The operating system 134 and the software components 136 to 146 that are executed by the main processor 102 are typically stored in a persistent store such as the memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications are installed on the portable electronic device 100 during its manufacture. Other software applications include a message application 138 that can be any suitable software program that allows a user of the portable electronic device 100 to send and receive electronic messages. Various alternatives exist for the message application 138 as is well known to those skilled in the art. Messages that have been sent or received by the user are typically stored in the flash memory 108 of the portable electronic device 100 or some other suitable storage element in the portable electronic device 100. In at least some embodiments, some of the sent and received messages may be stored remotely from the device 100 such as in a data store of an associated host system that the portable electronic device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the portable electronic device 100 is turned off or loses power.

The PIM 142 includes functionality for organizing and managing data items of interest to the user, such as, but not limited to, e-mail, contacts, calendar events, voice mails, appointments, and task items. PIM applications include, for example, calendar, address book, tasks and memo applications. The PIM applications have the ability to send and receive data items via the wireless network 200. PIM data items may be seamlessly integrated, synchronized, and updated via the wireless network 200 with the portable electronic device subscriber's corresponding data items stored and/or associated with a host computer system. This functionality creates a mirrored host computer on the portable electronic device 100 with respect to such items. This can be particularly advantageous when the host computer system is the portable electronic device subscriber's office computer system.

The portable electronic device 100 also includes a connect module 144, and an information technology (IT) policy module 146. The connect module 144 implements the communication protocols that are required for the portable electronic device 100 to communicate with the wireless infrastructure and any host system, such as an enterprise system, that the portable electronic device 100 is authorized to interface with. Examples of a wireless infrastructure and an enterprise system are given in FIG. 3 and FIG. 4, which are described in more detail below.

The connect module 144 includes a set of APIs that can be integrated with the portable electronic device 100 to allow the portable electronic device 100 to use any number of services associated with the enterprise system. The connect module 144 allows the portable electronic device 100 to establish an end-to-end secure, authenticated communication pipe with the host system. A subset of applications for which access is provided by the connect module 144 can be used to pass IT policy commands from the host system to the portable electronic device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be provided on the portable electronic device 100 and still others can be installed on the portable electronic device 100. Such software applications can be third party applications, which are added after the manufacture of the portable electronic device 100. Examples of third party applications include games, calculators, utilities, etc.

The additional applications can be loaded onto the portable electronic device 100 through at least one of the wireless network 200, the auxiliary I/O subsystem 112, the data port 114, the short-range communications subsystem 122, or any other suitable device subsystem 124. This flexibility in application installation increases the functionality of the portable electronic device 100 and may provide enhanced on-device functions, communication-related functions, or both. For example, secure communication applications may enable electronic commerce functions and other such financial transactions to be performed using the portable electronic device 100.

The data port 114 enables a subscriber to set preferences through an external device or software application and extends the capabilities of the portable electronic device 100 by providing for information or software downloads to the portable electronic device 100 other than through a wireless communication network. The alternate download path may, for example, be used to load an encryption key onto the portable electronic device 100 through a direct and thus reliable and trusted connection to provide secure device communication.

The data port 114 can be any suitable port that enables data communication between the portable electronic device 100 and another computing device. The data port 114 can be a serial or a parallel port. In some instances, the data port 114 can be a USB port that includes data lines for data transfer and a supply line that can provide a charging current to charge the battery 130 of the portable electronic device 100.

The short-range communications subsystem 122 provides for communication between the portable electronic device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, Web page download, or any other information is processed by the communication subsystem 104 and input to the main processor 102. The main processor 102 will process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the portable electronic device 100 is substantially similar, except that the received signals are output to the speaker 118, and signals for transmission are generated by the microphone 120. Alternative voice or audio I/O subsystems, such as a voice message recording subsystem, can also be implemented on the portable electronic device 100. Although voice or audio signal output is accomplished primarily through the speaker 118, the display 110 can also be used to provide additional information such as the identity of a calling party, duration of a voice call, or other voice call related information.

Figure 2:
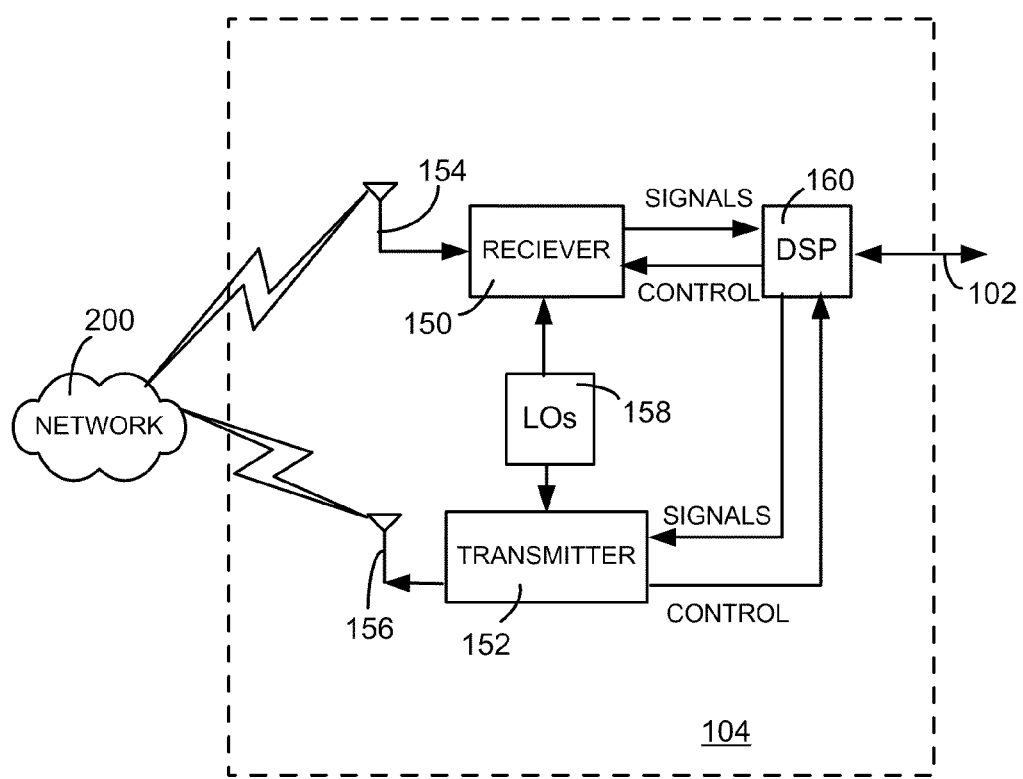
FIG. 2 is an example of a block diagram of a communication subsystem component of FIG. 1.

Referring now to FIG. 2, an example of a block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the portable electronic device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (ND) conversion. ND conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the portable electronic device 100 and the wireless network 200 can contain one or more different channels, typically different RF channels, and associated protocols used between the portable electronic device 100 and the wireless network 200. An RF channel is a limited resource that should be conserved, typically due to limits in overall bandwidth and limited battery power of the portable electronic device 100.

When the portable electronic device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
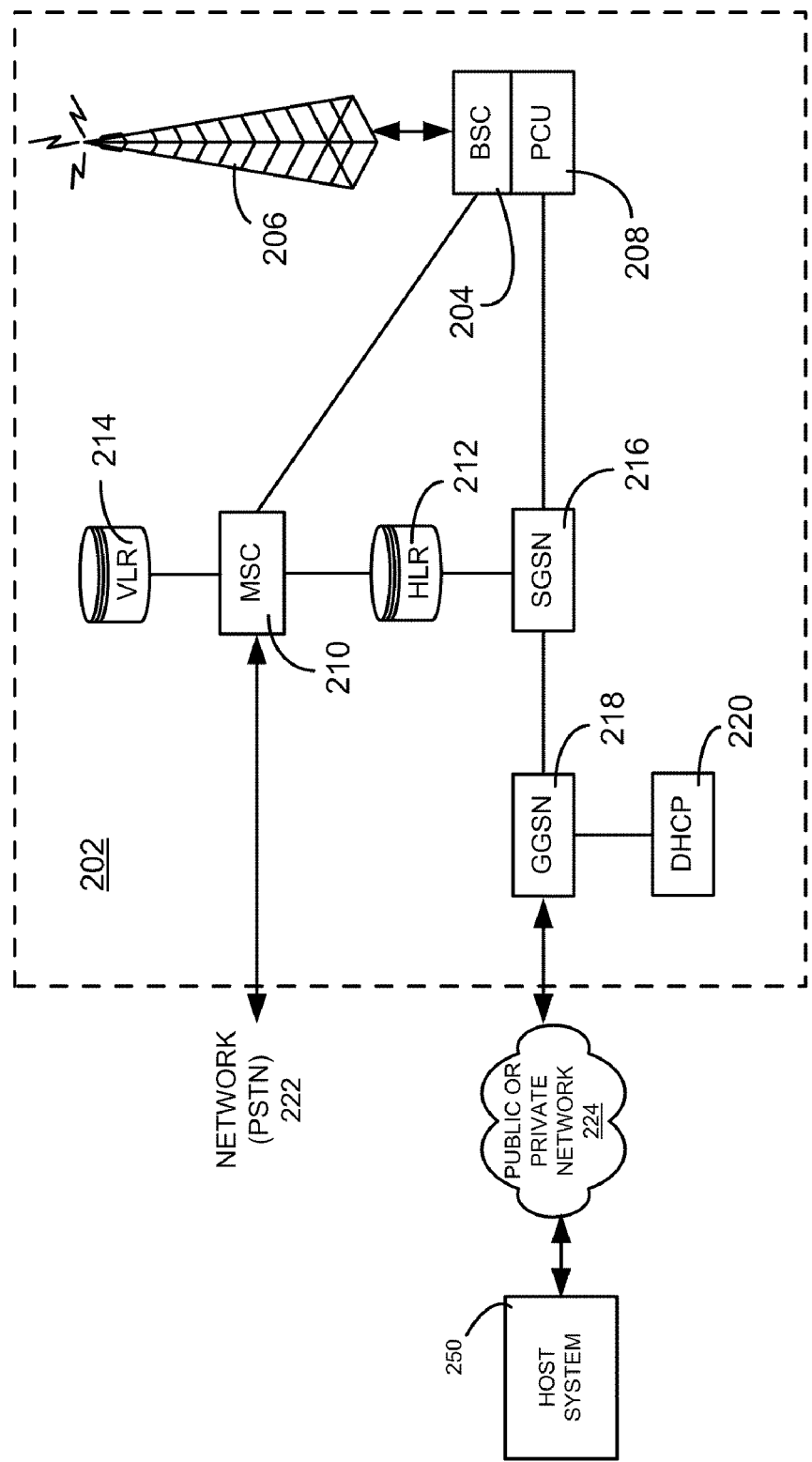
FIG. 3 is an example of a block diagram of an implementation of a node of a wireless network.

Referring now to FIG. 3, an example of a block diagram of an implementation of a node 202 of the wireless network 200 is shown. In practice, the wireless network 200 comprises one or more nodes 202. In conjunction with the connect module 144, the portable electronic device 100 can communicate with the node 202 within the wireless network 200. In the implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable portable electronic devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the portable electronic device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from portable electronic devices within its cell via the station 206. The fixed transceiver equipment normally performs such functions as modulation and possibly encoding and/or encryption of signals to be transmitted to the portable electronic device 100 in accordance with particular, usually predetermined, communication protocols and parameters, under control of its controller. The fixed transceiver equipment similarly demodulates and possibly decodes and decrypts, if necessary, any communication signals received from the portable electronic device 100 within its cell. Communication protocols and parameters may vary between different nodes. For example, one node may employ a different modulation scheme and operate at different frequencies than other nodes.

For all portable electronic devices 100 registered with a specific network, permanent configuration data such as a user profile is stored in the HLR 212. The HLR 212 also contains location information for each registered portable electronic device and can be queried to determine the current location of a portable electronic device. The MSC 210 is responsible for a group of location areas and stores the data of the portable electronic devices currently in its area of responsibility in the VLR 214. Further, the VLR 214 also contains information on portable electronic devices that are visiting other networks. The information in the VLR 214 includes part of the permanent portable electronic device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each portable electronic device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given portable electronic device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a portable electronic device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each portable electronic device 100 must be assigned to one or more APNs and portable electronic devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a portable electronic device 100 is not using its PDP Context, the PDP Context can be de-allocated and the IP address returned to the IP address pool managed by the DHCP server 220.

Figure 4:
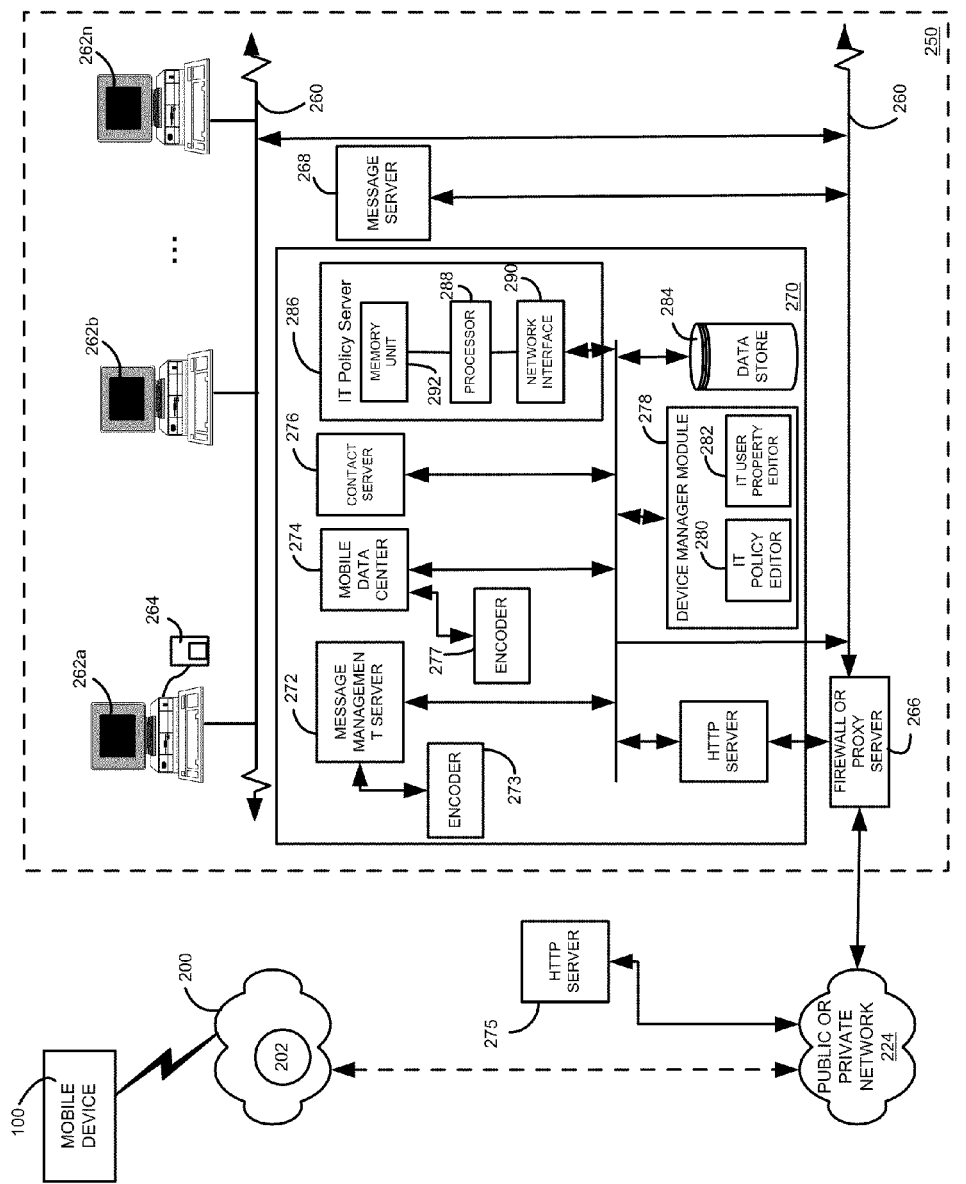
FIG. 4 is an example of a block diagram illustrating components of a configuration of a host system with which the portable electronic device can communicate.

Referring now to FIG. 4, shown therein is an example of a block diagram illustrating components of an configuration of a host system 250 that the portable electronic device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the portable electronic device 100 belongs. Typically, a plurality of portable electronic devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's portable electronic device 100 is situated on a LAN connection. The cradle 264 for the portable electronic device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the portable electronic device 100, and may be particularly useful for bulk information updates often performed in initializing the portable electronic device 100 for use. The information downloaded to the portable electronic device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this configuration. More generally, the host system 250 may represent a smaller part of a larger network (not shown) of the organization, and may comprise different components and/or be arranged in different topologies than that shown in the embodiment of FIG. 4.

To facilitate the operation of the portable electronic device 100 and the wireless communication of messages and message-related data between the portable electronic device 100 and components of the host system 250, a number of wireless communication support components 270 can be provided. In some implementations, the wireless communication support components 270 can include a management server 272, a mobile data server (MDS) 274, a web server, such as Hypertext Transfer Protocol (HTTP) server 275, a contact server 276, and a device manager module 278. HTTP servers can also be located outside the enterprise system, as indicated by the HTTP server 275 attached to the network 224. The device manager module 278 includes an IT Policy editor 280 and an IT user property editor 282, as well as other software components for allowing an IT administrator to configure the portable electronic devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the portable electronic devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this embodiment, the portable electronic device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the portable electronic device 100. The wireless VPN router allows a VPN connection to be established directly through a specific wireless network to the portable electronic device 100. The wireless VPN router can be used with the Internet Protocol (IP) Version 6 (IPV6) and IP-based wireless networks. This protocol can provide enough IP addresses so that each portable electronic device has a dedicated IP address, making it possible to push information to a portable electronic device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the portable electronic device 100 in this alternative implementation.

Messages intended for a user of the portable electronic device 100 are initially received by a message server 268 of the host system 250. Such messages may originate from any number of sources. For instance, a message may have been sent by a sender from the computer 262b within the host system 250, from a different portable electronic device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some examples of implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server provides additional functions including PIM functions such as calendaring, contacts and tasks and supports data storage.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the portable electronic device 100. Alternatively, the data store associated with the message server 268 can store all of the messages for the user of the portable electronic device 100 and only a smaller number of messages can be stored on the portable electronic device 100 to conserve memory. For instance, the most recent messages (i.e. those received in the past two to three months for example) can be stored on the portable electronic device 100.

When operating the portable electronic device 100, the user may wish to have e-mail messages retrieved for delivery to the portable electronic device 100. The message application 138 operating on the portable electronic device 100 may also request messages associated with the user's account from the message server 268. The message application 138 may be configured (either by the user or by an administrator, possibly in accordance with an organization's IT policy) to make this request at the direction of the user, at some pre-defined time interval, or upon the occurrence of some pre-defined event. In some implementations, the portable electronic device 100 is assigned its own e-mail address, and messages addressed specifically to the portable electronic device 100 are automatically redirected to the portable electronic device 100 as they are received by the message server 268.

The management server 272 can be used to specifically provide support for the management of, for example, messages, such as e-mail messages, that are to be handled by portable electronic devices. Generally, while messages are still stored on the message server 268, the management server 272 can be used to control when, if, and how messages are sent to the portable electronic device 100. The management server 272 also facilitates the handling of messages composed on the portable electronic device 100, which are sent to the message server 268 for subsequent delivery.

For example, the management server 272 may monitor the user's "mailbox" (e.g. the message store associated with the user's account on the message server 268) for new e-mail messages, and apply user-definable filters to new messages to determine if and how the messages are relayed to the user's portable electronic device 100. The management server 272 may also, through an encoder 273, compress messages, using any suitable compression technology (e.g. YK compression, and other known techniques) and encrypt messages (e.g. using an encryption technique such as Data Encryption Standard (DES), Triple DES, or Advanced Encryption Standard (AES)), and push them to the portable electronic device 100 via the shared network infrastructure 224 and the wireless network 200. The management server 272 may also receive messages composed on the portable electronic device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the portable electronic device 100 can be defined (e.g. by an administrator in accordance with IT policy) and enforced by the management server 272. These may include whether the portable electronic device 100 may receive encrypted messages or signed messages or both encrypted and signed messages, minimum encryption key sizes, whether outgoing messages must be encrypted or signed or encrypted and signed, and whether copies of all secure messages sent from the portable electronic device 100 are to be sent to a pre-defined copy address, for example.

The management server 272 may also be adapted to provide other control functions, such as only pushing certain message information or pre-defined portions (e.g. "blocks") of a message stored on the message server 268 to the portable electronic device 100. For example, in some cases, when a message is initially retrieved by the portable electronic device 100 from the message server 268, the management server 272 may push only the first part of a message to the portable electronic device 100, with the part being of a pre-defined size (e.g. 2 KB). The user can then request that more of the message be delivered in similar-sized blocks by the management server 272 to the portable electronic device 100, possibly up to a maximum pre-defined message size. Accordingly, the management server 272 facilitates better control over the type of data and the amount of data that is communicated to the portable electronic device 100, and can help to minimize potential waste of bandwidth or other resources.

The MDS 274 encompasses any other server that stores information that is relevant to the corporation. The mobile data server 274 may include, but is not limited to, databases, online data document repositories, customer relationship management (CRM) systems, or enterprise resource planning (ERP) applications. The MDS 274 can also connect to the Internet or other public network, through HTTP server 275 or other suitable web server such as an File Transfer Protocol (FTP) server, to retrieve HTTP webpages and other data. Requests for webpages are typically routed through MDS 274 and then to HTTP server 275, through suitable firewalls and other protective mechanisms. The web server then retrieves the webpage over the Internet, and returns it to MDS 274. As described above in relation to management server 272, MDS 274 is typically provided, or associated, with an encoder 277 that permits retrieved data, such as retrieved webpages, to be compressed, using any suitable compression technology (e.g. YK compression, and other known techniques), and encrypted (e.g. using an encryption technique such as DES, Triple DES, or AES), and then pushed to the portable electronic device 100 via the shared network infrastructure 224 and the wireless network 200.

The contact server 276 can provide information for a list of contacts for the user in a similar fashion as the address book on the portable electronic device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the management server 272, the MDS 274, the HTTP server 275, the contact server 276, the device manager module 278, the data store 284 and the IT policy server 286 do not need to be implemented on separate physical servers within the host system 250. For example, some or all of the functions associated with the management server 272 may be integrated with the message server 268, or some other server in the host system 250. Alternatively, the host system 250 may comprise multiple management servers 272, particularly in variant implementations where a large number of portable electronic devices need to be supported.

The device manager module 278 provides an IT administrator with a graphical user interface with which the IT administrator interacts to configure various settings for the portable electronic devices 100. As mentioned, the IT administrator can use IT policy rules to define behaviors of certain applications on the portable electronic device 100 that are permitted such as phone, web browser or Instant Messenger use. The IT policy rules can also be used to set specific values for configuration settings that an organization requires on the portable electronic devices 100 such as auto signature text, WLAN/VoIP/VPN configuration, security requirements (e.g. encryption algorithms, password rules, etc.), specifying themes or applications that are allowed to run on the portable electronic device 100, and the like.

Figure 5:
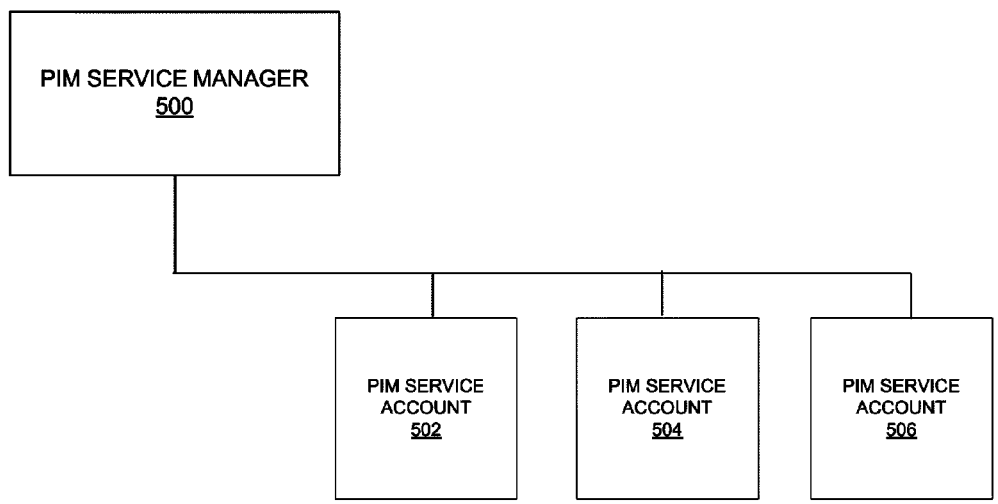
FIG. 5 is an example of a block diagram illustrating functional components of a PIM service manager of a portable electronic device.

Reference is now made to FIG. 5 to describe an example embodiment of a PIM service manager 500 operating on the portable electronic device 100. The PIM service manager 500 acts as an intermediary or middle manager by managing accounts that are associated with PIM services and are operational on the portable electronic device 100. An account that is associated with a PIM service is hereinafter referred to as a PIM service account. In the example embodiment shown in FIG. 5, the PIM service manager 500 manages three PIM service accounts 502, 504, 506. The capabilities of the three PIM services associated with the PIM service accounts 502, 504, 506 are received by the PIM service manager 500 from the PIM services associated with the PIM service accounts 502, 504, 506, respectively, and stored on the portable electronic device 100 as PIM service records. The capabilities include, for example, whether a PIM service is operable to receive an update, to turn on and turn off an out-of-office assistant at the PIM service, from the portable electronic device 100.

It will be appreciated that while three PIM service accounts 502, 504, 506 are shown in the example embodiment of FIG. 5, a greater or lesser number of PIM service accounts may be enabled for operation on the portable electronic device.

The following generally describes an apparatus and a method of controlling an electronic device, the method comprising detecting, at the electronic device, occurrence of an event for turning on an out-of-office assistant, for each account, associated with a respective PIM service, that is operational on the electronic device, determining if the PIM service is operable to receive updates, when the PIM service is operable to receive an update from the electronic device to turn on an out-of-office notification, sending the update from the electronic device to the PIM service, otherwise, sending an out-of-office notification, from the electronic device, in response to receipt of an email message at the electronic device, via the PIM service.

Figure 6:
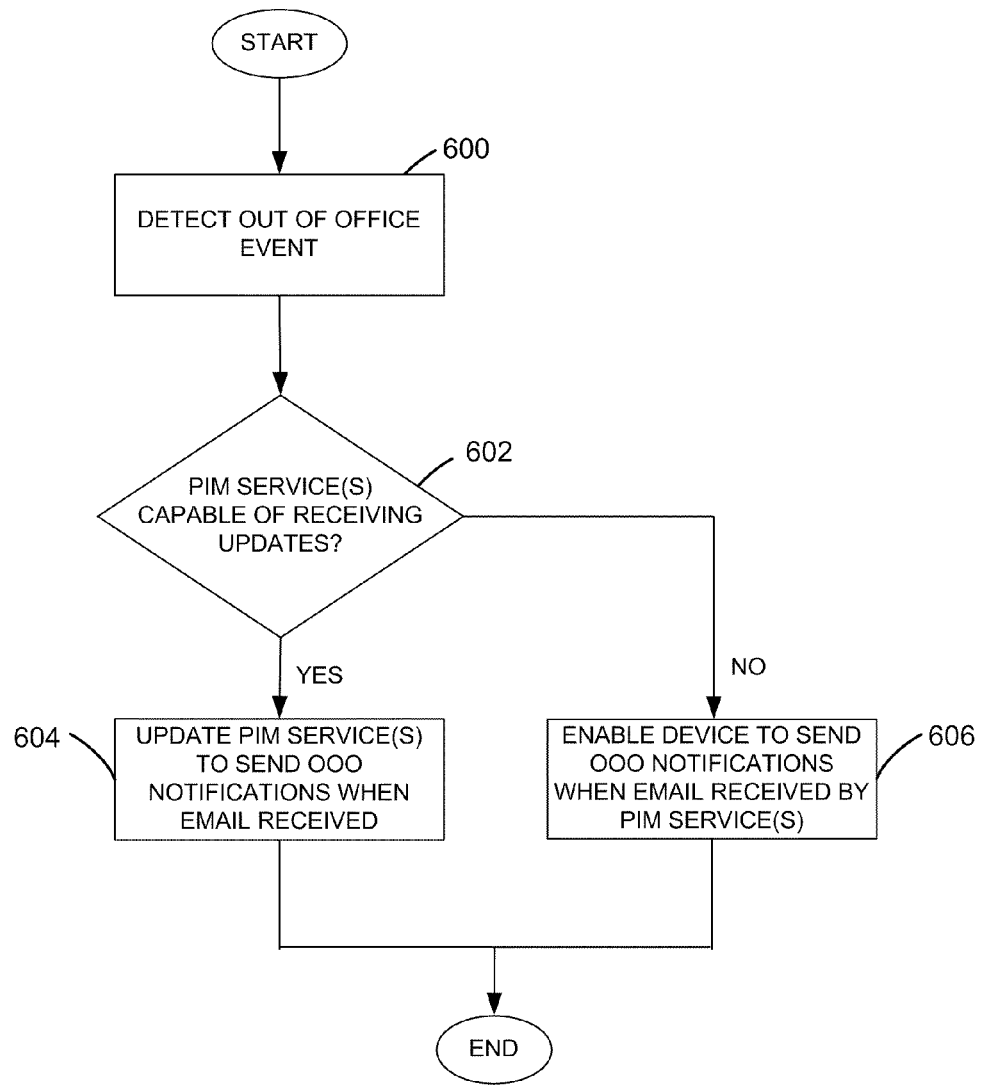
FIG. 6 is a flowchart showing the steps of a method for controlling a portable electronic device according to an embodiment of the present invention.

Reference is now made to FIG. 6 to describe an embodiment of a method of the present application. The method of FIG. 6 may be carried out by routines or subroutines executed by the microprocessor 102. Coding of software for carrying out such a method is within the scope of a person of ordinary skill in the art given the present description.

When an out-of-office event is detected 600, the capabilities of each PIM service associated with a respective PIM service account enabled for operation on the portable electronic device 100 are determined 602 to determine which PIM services are operable to receive updates to turn on and turn off the out-of-office assistant at the PIM service. An update is sent 604 to each PIM service that is operable to receive updates, from the portable electronic device 100, to turn on the out-of-office assistant at each PIM service so that when an email is received at the PIM service account associated with the PIM service, the PIM service automatically sends an out-of-office notification to the email address of the sender.

For each PIM service account associated with a PIM service that is determined 602 not to be operable to receive updates, the PIM service manager 500 enables a setting on the portable electronic device 100 to send 606 an out-of-office notification in response to receipt of an email message at the portable electronic device 100, via the PIM service account. When an email is received at the portable electronic device 100, via a PIM service associated with a PIM service account that is not operable to receive updates, the portable electronic device 100 sends an out-of-office notification.

An out-of-office event is detected 600 when the out-of-office assistant of the portable electronic device 100 is turned on, for example, by selection of an option or feature such as an option in a menu or sub-menu screen (not shown) on the portable electronic device 100. Alternatively, an out-of-office event is detected 600 when the out-of-office assistant of the portable electronic device 100 is automatically turned on. The out-of-office assistant may be automatically turned on, for example, during a calendared event that is an event for turning on an out-of-office assistant, referred to hereinafter as an out-of-office calendared event. Calendared events are records that represent calendar events, such as meetings, appointments, lectures, exams, movies, performances, dinners, ceremonies, etc. Each calendared event includes a variety of information including a date and time of the calendar event. The calendared events are stored on the portable electronic device 100 for display in a graphical user interface (GUI). The calendared events may be created on the portable electronic device 100 or created on another device, utilizing a calendar application, and transmitted to the portable electronic device 100 using either wired or wireless transmission.

As described above, a calendared event is a record. The record may include a bit flag that indicates that the calendared event is an out-of-office calendared event. A calendared event whose bit flag is activated by, for example, selection of an "OUT OF OFFICE" option in a calendar application, is an out-of-office calendared event. An out-of-office calendared event includes, for example, a start time, an end time, and a list of PIM service accounts enabled for operation on the portable electronic device 100 for which out-of-office assistants are to be turned on. The out-of-office assistant of the portable electronic device 100 is automatically turned on when the start time of the out-of-office calendared event and a current time of the portable electronic device 100 are equivalent. The out-of-office assistant of the portable electronic device 100 may also be automatically turned on when the current time of the portable electronic device 100 is between the start time and end time of the out-of-office calendared event. The automatic turning on of the out-of-office assistant of a portable electronic device 100 is described below with reference to FIG. 12.

Figure 7:
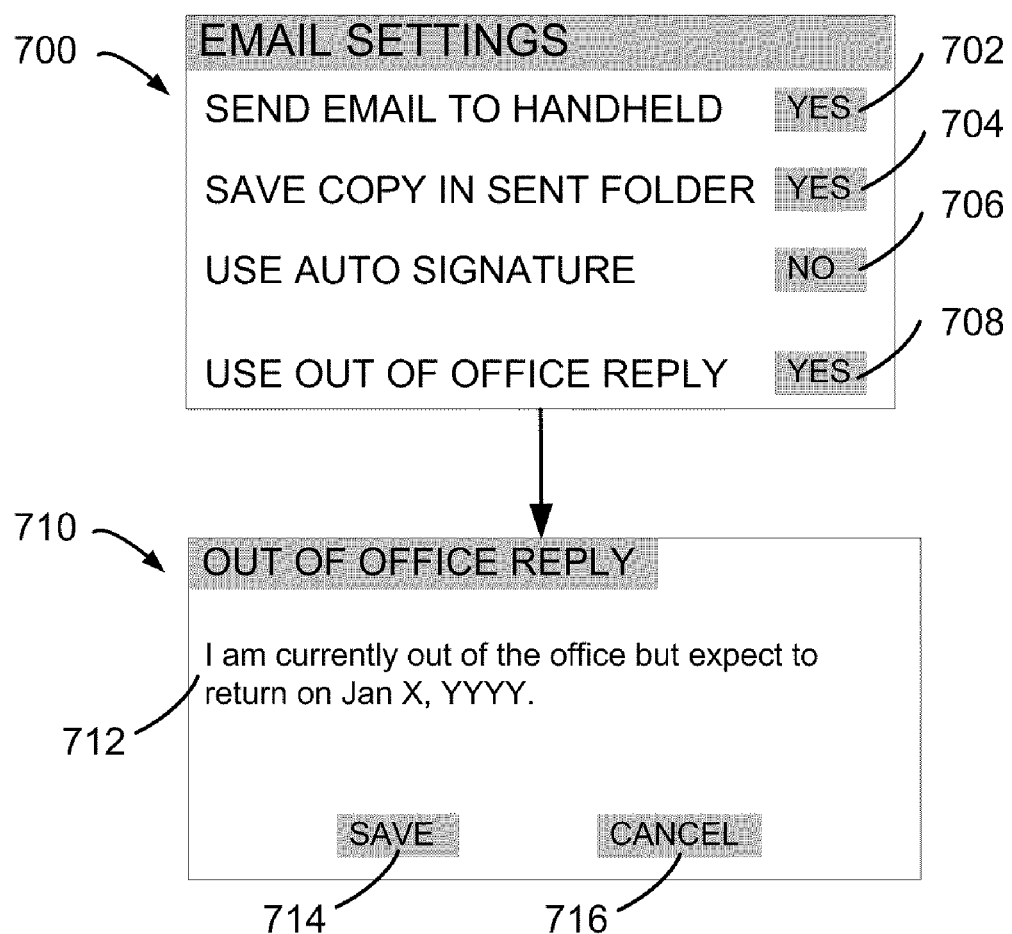
FIG. 7 shows example screen shots for turning on an out of office assistant of a portable electronic device according to an embodiment of the present invention.

Reference is now made to FIG. 7 to describe an example of detection of an out-office event. According to the example of FIG. 7, when selection of an email settings option from a menu screen (not shown) is received, a sub-menu screen 700 is rendered on the portable electronic device 100. The sub-menu screen 700 includes various options, such as, for example, a "SEND EMAIL TO HANDHELD" option 702, a "SAVE COPY IN SENT FOLDER" option 704, a "USE AUTO SIGNATURE" option 706, and a "USE OUT OF OFFICE REPLY" option 708 for turning on and turning off the out-of-office assistant of the portable electronic device 100.

When the "USE OUT OF OFFICE REPLY" option 708 is set to "YES" by, for example, toggling from "NO" to "YES" in a sub-menu screen (not shown), a sub-menu screen 710 is rendered on the portable electronic device 100. The sub-menu screen 710 includes, for example, an "OUT OF OFFICE REPLY" field 712 for entering an out-of-office message, a "SAVE" option 714 for saving changes made to the sub-menu screen 700 and the sub-menu screen 710, and a "CANCEL" option 716 for exiting the email settings sub-menu screen 700 without saving changes made to the sub-menu screen 700 and the sub-menu screen 710. A customized out-of-office message may be entered in field 712 by selection of the "OUT OF OFFICE REPLY" field 712 by, for example, placement of a cursor (not shown) in the field 712 and typing in the field 712. In the example shown in FIG. 7, only one customized out-of-office message is entered and utilized for all PIM service accounts.

When the "SAVE" option 714 is selected by, for example, scrolling a cursor to the "SAVE" option 714 and pressing, for example, the trackball 115, an out-of-office event is detected. When the "CANCEL" option 716 is selected, the emails settings sub-menu screen 700 of the portable electronic device 100 is exited without saving changes made to the sub-menu screen 700 and the sub-menu screen 710.

Continued reference is now made to FIG. 6 and FIG. 7. When the "SAVE" option 714 is selected, an out-of-office event is detected 600 and the out-of-office assistant of the portable electronic device 100 is turned on. The capabilities of each PIM service associated with a PIM service account enabled for operation on the portable electronic device 100 are determined 602 to determine which PIM services are operable to receive updates to turn on and turn off the out-of-office assistant at the PIM service. An update is sent 604 to each PIM service that is operable to receive updates, from the portable electronic device 100, to turn on the out-of-office assistant at each PIM service so that when an email is received at the PIM service account associated with the PIM service, the PIM service automatically sends an out-of-office notification to the email address of the sender. The update includes, for example, the customized out-of-office message entered in field 712. Alternatively, a default out-of-office message may be utilized.

When a default out-of-office message is utilized, the message may be generated from a record stored in the portable electronic device 100 which includes a text field with a default out-of-office message and tags, such as a location tag for including the type of out-of-office event in the default out-of-office message, a follow up tag for including a contact name in the default out-of-office message, and an end date tag for including an end date in the default out-of-office message.

For each PIM service account associated with a PIM service that is determined 602 not to be operable to receive updates, the PIM service manager 500 enables a setting on the portable electronic device 100 to send 606 an out-of-office notification in response to receipt of an email message at the portable electronic device 100, via the PIM service associated with the PIM service account. When an email is received at the portable electronic device 100, via a PIM service associated with a PIM service account that is not operable to receive updates, the portable electronic device 100 sends an out-of-office notification. The out-of-office notification may include the customized out-of-office message entered in field 712. Alternatively, a default out-of-office message may be utilized in the out-of-office notification.

Figure 8:
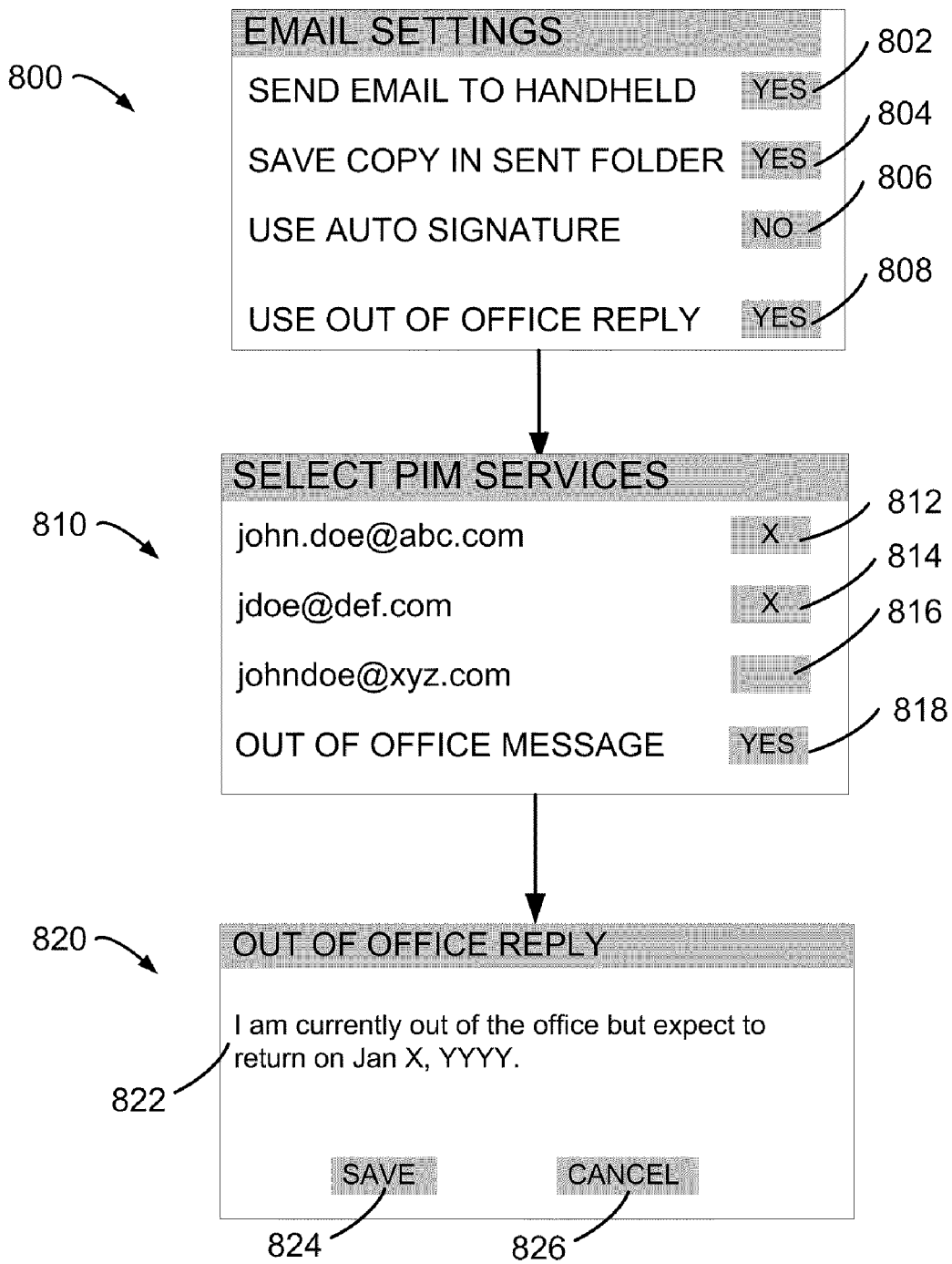
FIG. 8 shows example screen shots for turning on an out of office assistant of a portable electronic device according to another embodiment of the present invention.

Reference is now made to FIG. 8 to describe another example of detection of an out-of-office event. In the example of FIG. 8, the portable electronic device 100 has three enabled PIM service accounts, "abc", "def", and "xyz". For the purposes of this example, the PIM service accounts "abc" and "xyz" are operable to receive updates, to turn on and turn off their out-of-office assistant, from a portable electronic device 100 and the PIM service account "def" is not operable to receive updates.

According to the example of FIG. 8, when selection of an email settings option from a menu screen (not shown) is received, a sub-menu screen 800 is rendered on the portable electronic device 100. The sub-menu screen 800 includes various options including, for example, a "SEND EMAIL TO HANDHELD" option 802, a "SAVE COPY IN SENT FOLDER" option 804, a "USE AUTO SIGNATURE" option 806, and a "USE OUT OF OFFICE REPLY" option 808 for turning on the out-of-office assistant of the portable electronic device 100.

When the "USE OUT OF OFFICE REPLY" option 808 is set to "YES, by, for example, toggling from "NO" to "YES" in a sub-menu screen (not shown), a "SELECT PIM SERVICES" sub-menu screen 810 is rendered on the portable electronic device 100. The "SELECT PIM SERVICES" sub-menu screen 810 includes, for example, a "john.doe@abc.com" option 812, a "jdoe@def.com" option 814, a "johndoe@xyz.com" option 816 for turning on the out-of-office assistants for the PIM service accounts enabled for operation on the portable electronic device.

The out-of-office assistants of the PIM service accounts "john.doe@abc.com" and "jdoe@def.com" may be turned on by selection of the fields 812 and 814. Fields 812 and 814 may be selected by scrolling a cursor or highlighting fields 812 and 814 and pressing, for example, on a trackball 115.

The "SELECT PIM SERVICES" sub-menu screen 810 also includes an "OUT OF OFFICE MESSAGE" option 818 for entering a customized out-of-office message. When an "OUT OF OFFICE MESSAGE" option 818 is set to "YES" by, for example, toggling from "NO" to "YES" in a sub-menu screen (not shown), a sub-menu screen 820 is rendered on the portable electronic device 100. The sub-menu field 820 includes, for example, an "OUT OF OFFICE REPLY" field 822 for entering a customized out-of-office message, a "SAVE" option 824 for saving changes made to the menu screen 800 and submenu screen 810, and a "CANCEL" option 826 for exiting the menu screen 800 without saving the changes made to the menu screen 800 and submenu screen 810. A customized out-of-office message may be entered in field 822 by selection of the "OUT OF OFFICE REPLY" field 822 by, for example, placement of a cursor (not shown) in the field 822 and entering text in the field 822. In the example shown, only one customized out-of-office message is entered and utilized for each of the PIM service accounts selected from submenu screen 810.

When the "SAVE" option 824 is selected by, for example, scrolling a cursor or highlighting "SAVE" option 824 and pressing, for example, on a trackball 115, an out-of-office event is detected. When the "CANCEL" option 826 is selected, the emails settings menu screen 800 is exited without saving changes made to the menu screen 800 and sub-menu screen 810.

Continued reference is now made to FIG. 6 and FIG. 8. When the "SAVE" option 824 is selected, an out-of-office event 600 is detected and the out-of-office assistant of the portable electronic device 100 is turned on. The capabilities of each PIM service associated with a PIM service account enabled for operation on the portable electronic device 100 are determined 602 to determine which PIM services are operable to receive updates, to turn on and turn off the out-of-office assistant at the PIM service, from the portable electronic device 100. In this example, PIM services "abc" and "xyz" are determined to be operable to receive updates, to turn on and turn off the out-of-office assistant, from the portable electronic device 100, and PIM service "def" is determined to be not operable to receive updates.

In the example of FIG. 8, an update to turn on the out-of-office assistant is only sent 604 to the PIM service "abc". This is because the PIM service "xyz" was not selected in sub-menu screen 810. The update includes the customized out-of-office notification entered in field 822. When an email is received by the PIM service account "john.doe@abc.com", the PIM service "abc" automatically sends an out-of-office notification that includes the customized out-of-office message 822 to the email address of the sender.

For the PIM service account "jdoe@def.com", the PIM service manager 500 enables a setting on the portable electronic device 100 to send 606 an out-of-office notification in response to receipt of an email message at the portable electronic device 100, via the PIM service "def". When an email is received at the portable electronic device, via the PIM service "def", the portable electronic device 100 sends an out-of-office notification to the email address of the sender. The out-of-office notification includes the customized out-of-office message entered in field 822.

Figure 9:
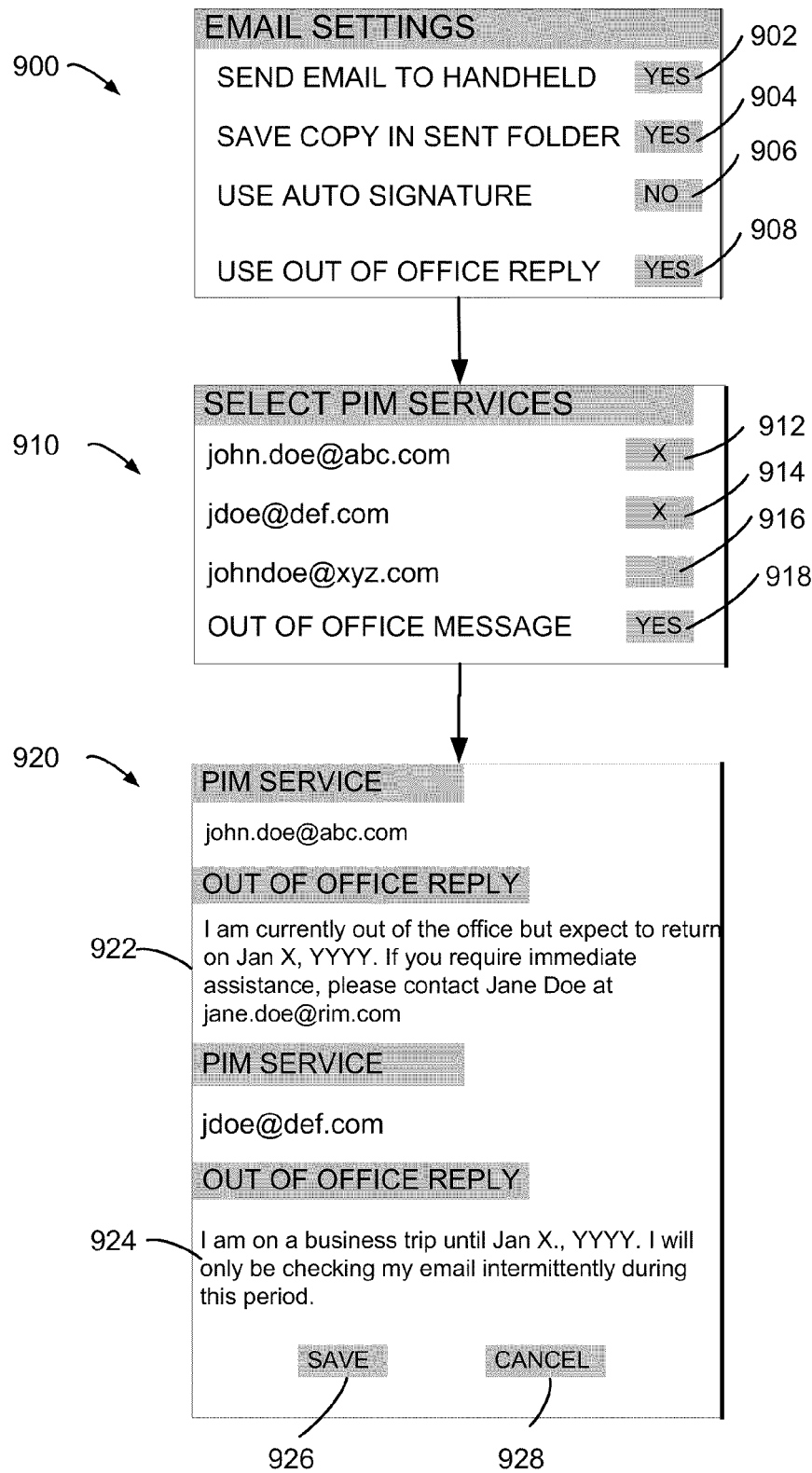
FIG. 9 shows screen shots for turning on an out-of-office assistant of a portable electronic device according to a still another example embodiment of the present invention.

Reference is now made to FIG. 9 to describe still another example of detection of an out-of-office event. In the example of FIG. 9, the portable electronic device 100 has three enabled PIM service accounts, "abc", "def", and "xyz". For the purposes of the example of FIG. 9, the PIM service accounts "abc" and "xyz" are operable to receive updates and the PIM service account "def" is not operable to receive updates.

According to the example of FIG. 9, when an email settings option from a menu screen (not shown) is selected, a sub-menu screen 900 is rendered on the portable electronic device 100. The sub-menu screen 900 includes various options including, for example, a "SEND EMAIL TO HANDHELD" option 902, a "SAVE COPY IN SENT FOLDER" option 904, a "USE AUTO SIGNATURE" option 906, and a "USE OUT OF OFFICE REPLY" option 908 for turning on the out-of-office assistant of the portable electronic device 100.

When the "USE OUT OF OFFICE REPLY" option 908 is set to "YES" by, for example, toggling from "NO" to "YES" in a sub-menu screen (not shown), a "SELECT PIM SERVICES" sub-menu screen 910 is rendered on the portable electronic device 100. The "SELECT PIM SERVICES" sub-menu screen 910 includes, for example, a "john.doe@abc.com" option 912, a "jdoe@def.com" option 914, a "johndoe@xyz.com" option 916 for turning on the out-of-office assistants for the PIM service accounts enabled on the portable electronic device 100. The out-of-office assistants of the PIM service accounts "john.doe@abc.com" and "jdoe@def.com" may be turned on by selection of the fields 912 and 914. Fields 912 and 914 may be selected by scrolling a cursor or highlighting fields 912 and 914 and pressing, for example, on a trackball 115.

The "SELECT PIM SERVICES" sub-menu screen 910 also includes an "OUT OF OFFICE MESSAGE" option 918 for entering a customized out-of-office message. When the OUT OF OFFICE MESSAGE" option 918 is set to "YES" by, for example, toggling from "NO" to "YES" in a sub-menu screen (not shown), a sub-menu screen 920 is rendered on the portable electronic device 100. The sub-menu field 920 includes, for example, an "OUT OF OFFICE REPLY" field 922 for entering a customized out-of-office message for the PIM service account "john.doe@abc.com", an "OUT OF OFFICE REPLY" field 924 for entering a customized out-of-office message for the PIM service account "john.doe@abc.com" field, a "SAVE" option 926 for saving changes made to the sub-menu screen 900 and the sub-menu screen 910, and a "CANCEL" option 928 for exiting the email settings sub-menu screen 900 without saving the changes made to the sub-menu screen 900 and the sub-menu screen 910. A customized out-of-office message may be entered in fields 922 and 924 by selection of the "OUT OF OFFICE REPLY" fields 922 and 924 by, for example, placement of a cursor (not shown) in the fields 922 and 924 and entering text in the fields 922 and 924. In the example shown, a different customized out-of-office messages may be entered for each PIM service accounts selected in sub-menu screen 910.

When the "SAVE" option 926 is selected by, for example, scrolling a cursor to or highlighting the "SAVE" option 926 and pressing on the trackball 115, an out-of-office event is detected. When the "CANCEL" option 928 is selected, the emails settings sub-menu screen 900 is exited and without saving any changes made to the sub-menu screen 900 and the sub-menu screen 910.

Continued reference is now made to FIG. 6 and FIG. 9. When the "SAVE" option 926 is selected, an out-of-office event is detected and the out-of-office assistant of the portable electronic device 100 is turned on. The capabilities of each PIM service associated with a PIM service account enabled on the portable electronic device 100 are determined 602 to determine which PIM services are operable to receive updates, to turn on and turn off the out-of-office assistant at the PIM service, from the portable electronic device 100. In the example of FIG. 9, the PIM services "abc" and "xyz" are determined to be operable to receive updates and the PIM service "def" is determined to be not operable to receive updates.

An update, to turn on the out-of-office assistant, is only sent 604 to the PIM service "abc" from the portable electronic device 100, because the PIM service account "johndoe@xyz.com" was not selected in sub-menu screen 810 to turn on the out-of-office assistant. The update includes the customized out-of-office message entered in field 922. When an email is received by the PIM service "john.doe@abc.com", the PIM service "abc" automatically sends an out-of-office notification, which includes the customized out-of-office message 922, to the email address of the sender For the PIM service account "johndoe@xyz.com", the PIM service manager 500 enables a setting on the portable electronic device 100 to send 606 an out-of-office notification in response to receipt of an email message at the portable electronic device 100 via the PIM service "xyz". When an email is received at the portable electronic device 100, via the PIM service "xyz", the portable electronic device 100 sends an out-of-office notification to the email address of the sender. The out-of-office notification sent by the portable electronic device 100 includes the customized out-of-office notification entered in the field 924.

Figure 10:
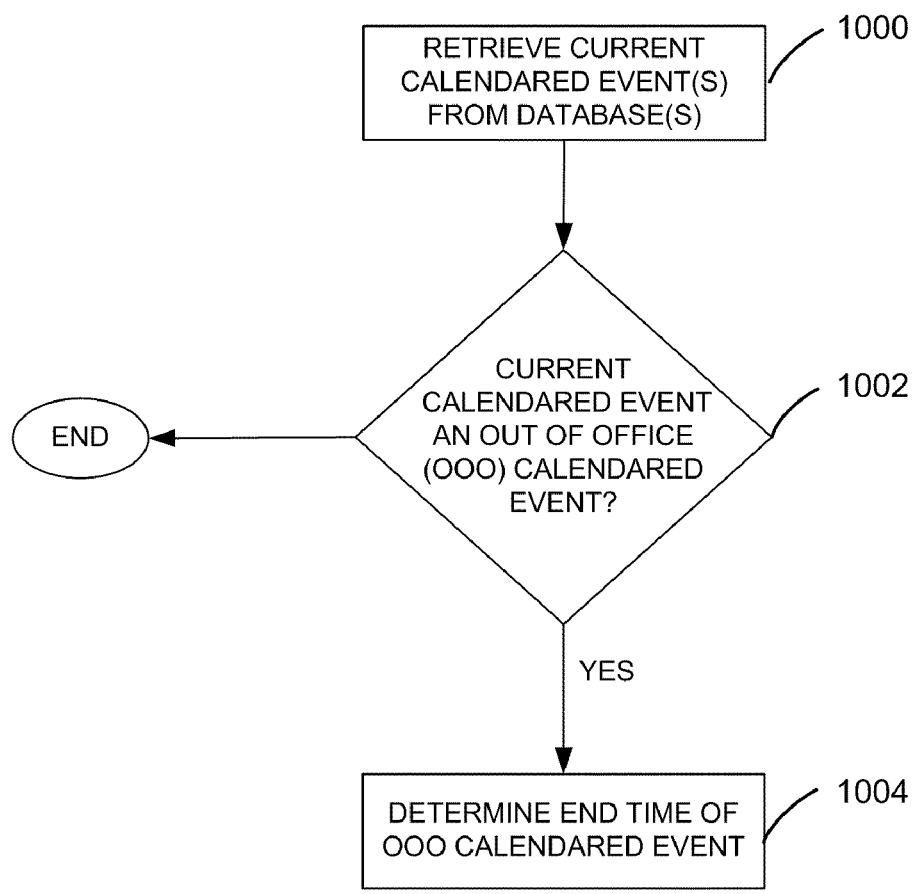
FIG. 10 is a flowchart showing substeps of the method for controlling a portable electronic device of FIG. 6.

Reference is now made to FIG. 10 to describe a flowchart illustrating sub-steps of the method of FIG. 6. Each of the steps of FIG. 10 may be carried out by routines or subroutines executed by the microprocessor 102. Coding of software for carrying out such a method is within the scope of a person of ordinary skill in the art given the present description.

In the example of FIG. 10, a calendar application, when executed by a microprocessor 102, provides a graphical user interface (GUI) to create calendared events, which are records relating to calendar events such as appointments, lectures, exams, meeting, performances, dinner, ceremonies, etc., and for storage of the calendared events in a database. A current calendared event is a calendared event that has a start time that is equivalent to the current time of the portable electronic device 100, or the current time of the portable electronic device 100 is between the start time and the end time of the calendared event.

Continued reference is now made to FIG. 10. To detect 600 an out-of-office event automatically, all current calendared events are retrieved 1000 from one or more databases in which calendared events are stored. After retrieving 1000 all the current calendared events, the out-of-office calendared events are determined 1002 from the current calendared events by determining the current calendared events that have the bit flag activated. Next, an end time for each out-of-office calendared event is determined 1004 and the remaining steps of FIG. 6 are executed.

Figure 11:
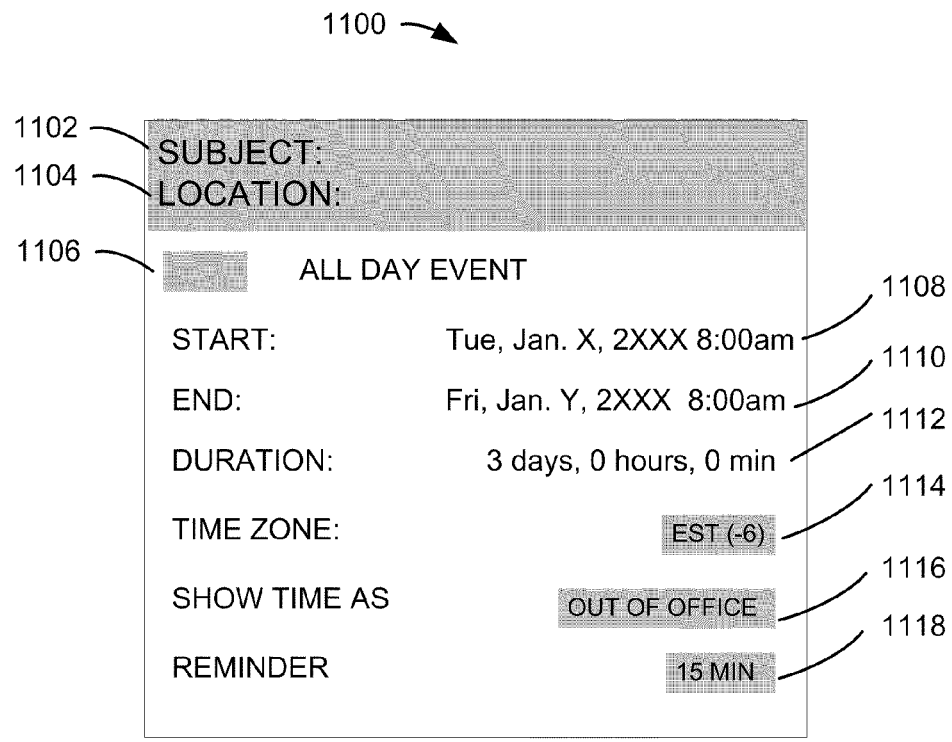
FIG. 11 shows a menu screen for creating an out-of-office calendared event on a portable electronic device according to an embodiment of the present invention.

Reference is now made to FIG. 11 to describe an example screen shot of an out-of-office calendared event for automatically turning on the out-of-office assistant of the portable electronic device 1000. In the example of FIG. 11, the menu screen 1100 includes a "SUBJECT" field 1102 for entering a subject of the out-of-office calendared event, a "LOCATION" field 1104 for entering the location of the out-of-office calendared event, an "ALL DAY EVENT" option 1106 for selecting when the out-of-office calendared event is an all day event, a "START" field 1108 for entering an start time for the out-of-office calendared event, an "END" field 1110 for entering an end time for the out-of-office calendared event, a "DURATION" field 1112 for rendering the duration of the out-of-office calendared event, a "TIME ZONE" option 1114, a "SHOW TIME AS" option 1116, and a "REMINDER" option 1118.

An out-of-office calendared event is created upon selection of an "OUT OF OFFICE" option 1116 by, for example, toggling between "FREE", "TENTATIVE", "BUSY" and "OUT OF OFFICE" to select the "OUT OF OFFICE" option. When a "SAVE" option is selected, by for example, moving a cursor over menu screen 1100, pressing the trackball 115, and selecting "SAVE" from a sub-menu screen (not shown) rendered on the display of the portable electronic device 100, the calendared event is stored in a database in which calendared events are stored with the bit flag activated to indicate that the calendared event is an out-of-office calendared event.

Figure 12:
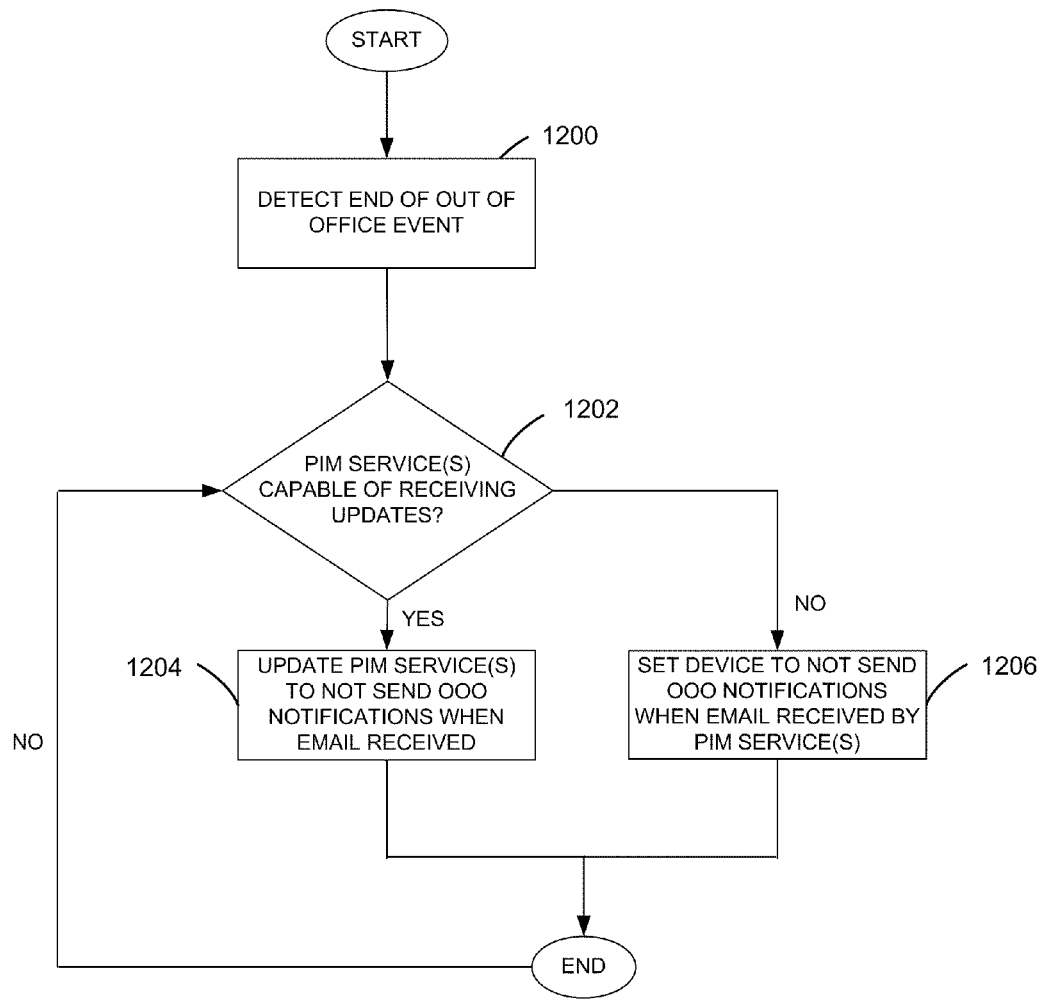
FIG. 12 is a flowchart showing further substeps of the method for controlling a portable electronic device of FIG. 6.

Reference is now made to FIG. 12 to describe a flowchart illustrating of example method of detecting an end of an-out-office event and turning off the out-of-office assistant at the portable electronic device 100. Each of the sub-steps of FIG. 12 may be carried out by routines or subroutines executed by the microprocessor 102. Coding of software for carrying out such a method is within the scope of a person of ordinary skill in the art given the present description.

When an end of an out-of-office event is detected 1200, the capabilities of each PIM service associated with a respective PIM service account enabled on the portable electronic device 100 are determined 1202. An update is sent 1204 to each PIM service that is operable to receive updates, from the portable electronic device 100, to turn off the out-of-office assistant at each PIM service that is operable to receive updates so that when an email is received by a PIM service account associated with a PIM service that is operable to receive updates, an out-of-office notification is no longer automatically sent to the email address of the sender.

For each PIM service account associated with a PIM service that is determined 1202 not to be operable to receive updates, the PIM service manager 500 disables 1206 the setting on the portable electronic device 100 to send an out-of-office notification in response to receipt of an email message at the portable electronic device 100, via the PIM service associated with the PIM service account. When an email is received at the portable electronic device 100, via a PIM service associated with a PIM service account that is not operable to receive updates, the portable electronic device 100 no longer sends an out-of-office notification.

In an alternative embodiment, the update that is sent 604 to each PIM service account includes the end time of the out-of-office calendared event. When the end time of the out-of-office calendared event is equivalent to the current time at the PIM service, an end of the out-of-office event is detected, and the out-of-office assistant at each PIM service that is operable to receive updates is automatically disabled.

For each PIM service account associated with a PIM service that is determined 606 not to be operable to receive updates, the PIM service manager 500 enables a setting on the portable electronic device 100 to send 606 an out-of-office notification in response to receipt of an email message at the portable electronic device 100, via the PIM service associated with the PIM service account. When an email is received at the portable electronic device 100, via a PIM service associated with a PIM service account that is not operable to receive updates, the portable electronic device 100 sends an out-of-office notification.

When the end time of the out-of-office calendared event is equivalent to the current time at the portable electronic device 100, and end of out-office event is detected 1202. The PIM service manager 500 disables 1206 the setting on the portable electronic device 100 to send an out-of-office notification in response to receipt of an email message received at the portable electronic device 100, via the PIM service associated with the PIM service account.

According to one aspect, there is provided a method of controlling an electronic device, the method comprising: detecting, at the electronic device, occurrence of an event for turning on an out of office assistant; for each account, associated with a respective PIM service, that is operational on the portable electronic device, determining if the PIM service is operable to receive updates, when the PIM service is operable to receive an update from the electronic device to turn on an out-of-office notification, sending the update from the portable electronic device to the PIM service; otherwise, sending an out-of-office notification, from the electronic device, in response to receipt of an email message at the electronic device, via the PIM service.

According to another aspect, there is provided an electronic device comprising: a display device; a memory; a processor operably connected to the display device and the memory, the processor being configured to execute computer-readable code stored in the memory to cause the electronic device to detect occurrence of an event for turning on an out of office assistant; for each account, associated with a PIM service, and operational on the portable electronic device, determine if the PIM service is operable to receive updates; when the PIM service is operable to receive an update from the electronic device to turn on an out-of-office notification, send the update from the electronic device to the PIM service; otherwise, send an out-of-office notification, from the electronic device, in response to receipt of an email message at the electronic device, via the PIM service.

According to another aspect, there is provided a computer program product for rendering calendared events on a display of an electronic device, the computer program product comprising a computer-readable medium having computer-readable code embodied therein executable by a processor of the electronic device to cause the electronic device to detect occurrence of an event for turning on an out of office assistant; for each account, associated with a PIM service, and operational on the portable electronic device, determine if the PIM service is operable to receive updates; when the PIM service is operable to receive an update from the electronic device to turn on an out-of-office notification, send the update from the electronic device to the PIM service; otherwise, send an out-of-office notification, from the electronic device, in response to receipt of an email message at the electronic device, via the PIM service.

Advantageously, an out-of-office assistant for multiple PIM service accounts is turned on and off from a portable electronic device. This obviates the need for a user to selected each PIM service account enabled on the portable electronic device using, for example a web application, to turn on and turn off the out-of-office assistant for each PIM service account. This reduces user interaction time with the portable electronic device 100, thereby reducing power consumption and battery use of the portable electronic device 100, and extending the time between charging the battery of the portable electronic device 100.

In the preceding description, for purposes of explanation, numerous details are set forth in order to provide a thorough understanding of the embodiments of the invention. It will apparent, however, to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of controlling an electronic device, the method comprising:
   detecting, at the electronic device, occurrence of an event for turning on out-of-office notifications;
   identifying accounts operable to turn on and off out-of-office notifications, each account of the identified accounts associated with a respective personal information manager (PIM) service and operational on the electronic device;
   for each account of the identified accounts,
      determining if the respective PIM service is operable to receive an update from the electronic device to turn on an out-of-office notification and if so, sending the update from the electronic device to the respective PIM service to cause the respective PIM service to send an out-of-office notification in response to receipt of an email message at the respective PIM service;
   when the respective PIM service is not operable to receive the update from the electronic device, sending an out-of-office notification, from the electronic device, in response to receipt of an email message at the electronic device, via the respective PIM service.

2. The method of claim 1, wherein said detecting comprises retrieving, from at least one database comprising a plurality of calendared events, at least one current calendared event; and
   determining if the current calendared event is an event for turning on out-of-office notifications.

3. The method of claim 2, wherein the at least one current calendared event has a start time equal to a current time.

4. The method of claim 2, comprising, after determining if the current calendared event is an event for turning on out-of-office notifications, determining an end time for the current calendared event for turning on out-of-office notifications.

5. The method of claim 4, wherein sending the update includes sending the end time.

6. The method of claim 4, comprising sending a further update when the current time is equal to the end time of the event for turning on out-of-office notifications.

7. The method of claim 4, comprising, determining a duration of the event for turning on out-of-office notifications based on the start time and the end time.

8. The method of claim 7, wherein sending the update includes sending the duration of the event for turning on out-of-office notifications.

9. An electronic device comprising:
   a display device;
   a memory;
   a processor operably connected to the display device and the memory, the processor being configured to execute computer-readable code stored in the memory to cause the electronic device to detect occurrence of an event for turning on out-of-office notifications;
   identifying accounts operable to turn on and off out-of-office notifications, each account of the identified accounts associated with a respective personal information manager (PIM) service and operational on the electronic device;
   for each account of the identified accounts,
      determine if the respective PIM service is operable to receive an update from the electronic device to turn on an out-of-office notification and if so, send the update from the electronic device to the respective PIM service to cause the respective PIM service to send an out-of-office notification in response to receipt of an email message at the respective PIM service;

when the respective PIM service is not operable to receive the update from the electronic device, send an out-of-office notification, from the electronic device, in response to receipt of an email message at the electronic device, via the respective PIM service.

10. The electronic device of claim 9, wherein, to detect occurrence of an event for turning on out-of-office notifications, the processor is operable to retrieve, from at least one database comprising a plurality of calendared events, at least one current calendared event, and determine if the current calendared event is an event for turning on out-of-office notifications.

11. The electronic device of claim 10, wherein the at least one current calendared event has a start time equal to a current time.

12. The electronic device of claim 10, wherein, if the current calendared event is determined to be an event for turning on out-of-office notifications, the processor is operable to determine an end time for the event for turning on out-of-office notifications.

13. The electronic device of claim 12, wherein the update includes the end time.

14. The electronic device of claim 12, wherein the processor is operable to send a further update when the current time is equal to the end time of the event for turning on out-of-office notifications.

15. The electronic device of claim 12, wherein the processor is operable to determine a duration of the event for turning on out-of-office notifications based on the start time and the end time.

16. The electronic device of claim 15, wherein the update includes the duration of the event for turning on out-of-office notifications.

17. A computer program product for rendering calendared events on a display of an electronic device, the computer program product comprising a non-transitory computer-readable medium having computer-readable code embodied therein executable by a processor of the electronic device to cause the electronic device to detect occurrence of an event for turning on out-of-office notifications;

identifying accounts operable to turn on and off out-of-office notifications, each account of the identified accounts associated with a respective personal information manager (PIM) service and operational on the electronic device;

for each account of the identified accounts, determine if the respective PIM service is operable to receive an update from the electronic device to turn on an out-of-office notification and if so, send the update from the electronic device to the respective PIM service to cause the respective PIM service to send an out-of-office notification in response to receipt of an email message at the respective PIM service;

when the respective PIM service is not operable to receive the update from the electronic device, send an out-of-office notification, from the electronic device, in response to receipt of an email message at the electronic device, via the respective PIM service.

* * * * *